United States Patent [19]

Odagawa

[11] Patent Number: 5,404,307
[45] Date of Patent: Apr. 4, 1995

[54] NAVIGATION APPARATUS WITH DETECTED ANGULAR SPEED CORRECTION

[75] Inventor: Satoshi Odagawa, Kawagoe, Japan

[73] Assignee: Pioneer Electronic Corporation, Tokyo, Japan

[21] Appl. No.: 990,470

[22] Filed: Dec. 15, 1992

[30] Foreign Application Priority Data

Dec. 19, 1991 [JP] Japan .................. 3-337212

[51] Int. Cl.⁶ .............................................. G06F 15/50
[52] U.S. Cl. .................... 364/454; 364/449; 340/995; 342/457
[58] Field of Search ............... 364/449, 452, 450, 454, 364/453, 571.02, 571.01; 33/326, 317 D, 356; 340/995; 342/357, 457

[56] References Cited

U.S. PATENT DOCUMENTS

| | | | |
|---|---|---|---|
| 4,470,119 | 9/1984 | Hasebe et al. | 364/449 |
| 4,924,402 | 5/1990 | Ando et al. | 364/449 |
| 4,949,268 | 8/1990 | Nishikawa et al. | 364/449 |
| 5,060,162 | 10/1991 | Ueyama et al. | 364/449 |
| 5,067,083 | 11/1991 | Nakayama et al. | 364/453 |
| 5,220,509 | 6/1993 | Takemura et al. | 364/449 |
| 5,235,514 | 8/1993 | Matsuzaki | 364/454 |
| 5,270,959 | 12/1993 | Matsuzaki et al. | 364/571.02 |
| 5,272,483 | 12/1993 | Kato | 342/357 |
| 5,278,424 | 1/1994 | Kagawa | 250/561 |
| 5,293,318 | 3/1994 | Fukushima | 364/449 |
| 5,327,348 | 7/1994 | Kato | 364/449 |
| 5,331,563 | 7/1994 | Matsumoto et al. | 364/449 |

Primary Examiner—Michael Zanelli
Attorney, Agent, or Firm—Kane, Dalsimer, Sullivan, Kurucz, Levy, Eisele and Richard

[57] ABSTRACT

A navigation apparatus for detecting and displaying at least an azimuth of a movable body, includes: an angular speed sensor for detecting an angular speed accompanied by the change in the azimuth of the movable body, and outputting angular speed data, which indicates the detected angular speed with respect to an output fiducial value; an azimuth detection device for detecting the azimuth of the movable body, and outputting azimuth data; and an offset correction device for computing a first amount in angle change of the azimuth of the movable body within a predetermined time interval from the angular speed data outputted by the angular speed sensor, computing a second amount in angle change of the azimuth of the movable body within the predetermined time interval from the azimuth data outputted by the azimuth detection device, and correcting the output fiducial value of the angular speed sensor so that the first and second amounts in angle changes become equal to each other.

8 Claims, 2 Drawing Sheets

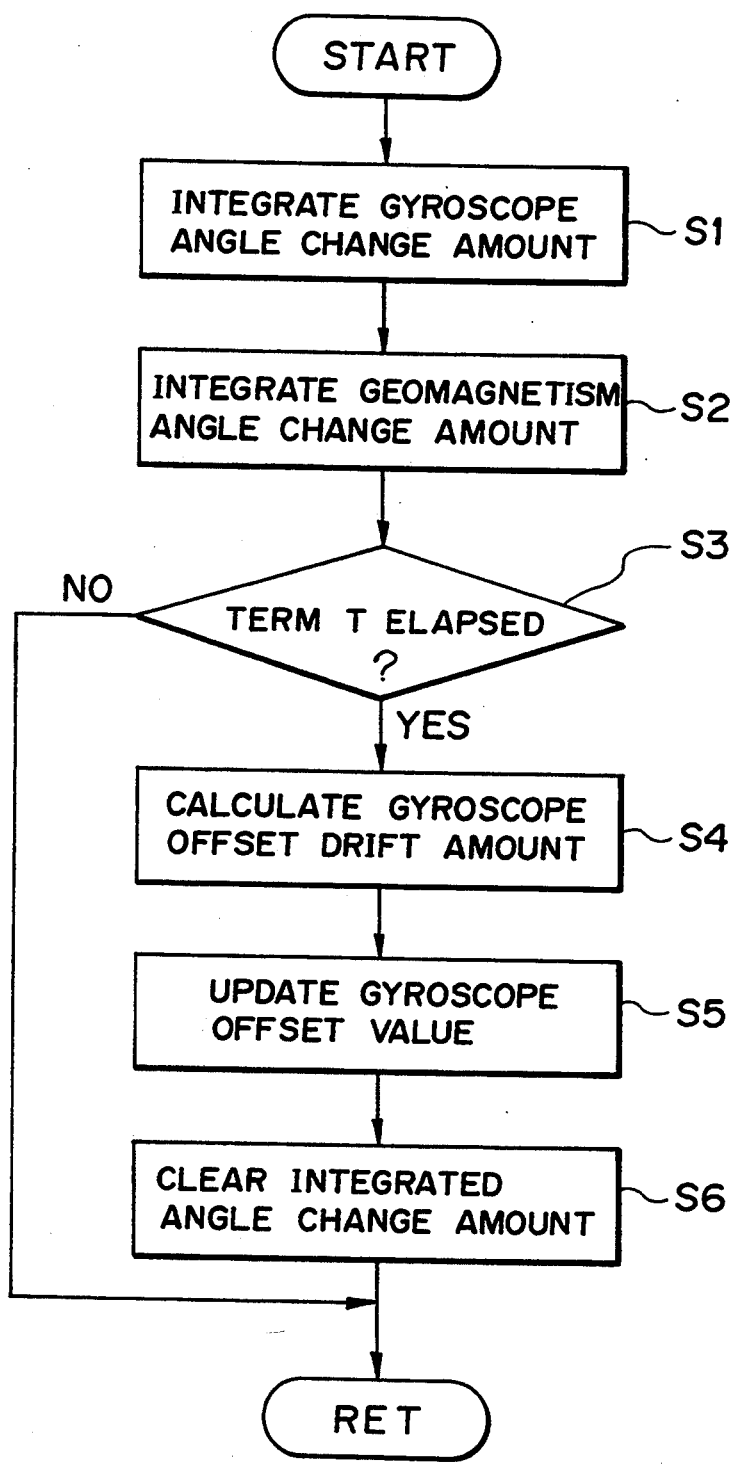

NAVIGATION APPARATUS WITH DETECTED ANGULAR SPEED CORRECTION

BACKGROUND OF THE INVENTION

1. Field of the Invention

The present invention is related with a navigation apparatus which carries out the indication display of the present position, the moving azimuth, etc. of a movable body on a map information, and supports operation of the movable body, such as a car, a ship, an aeroplane and so on. More specifically, the present invention is related with the correction with respect to the offset drift of the output of angular speed sensor, such as a gyroscope.

2. Description of the Related Art

In the navigation apparatus mounted in a car etc., instruction to a driver by displaying various information exactly and quickly one after another by the display device etc., is demanded. The various information is map information corresponding to a self-vehicle position, i.e. the present position, a self-vehicle position mark, and the mark which indicates a moving azimuth, and other information which is required by a user. This information is obtained by measuring an automobile position and a moving azimuth precisely.

The measurement of a self-vehicle position and a moving azimuth is performed by a system which receives the electric wave from GPS (Global Positioning System) satellite to compute the position and the azimuth (hereinbelow, it is referred to as "a GPS measurement"). Alternatively, the measurement of a self-vehicle position and a moving azimuth is performed by a system which has an angular speed sensor, such as a gyroscope, an azimuth detection sensor, such as a geomagnetism sensor, and a movement sensor which detects a movement state etc. of a car, and which computes the position and azimuth from the detection outputs of these sensors (hereinbelow, it is referred to as "a self-sustaining type measurement").

There are many advantages in the GPS measurement that there is no necessity of setting the position of a self-vehicle on a map beforehand, and the measurement error of a position is very little, and high reliability is obtained. For this reason, the GPS measurement has become very useful means. However, there is a problem that the GPS measurement cannot carry out a measurement in places behind something, such as a building, inside of a tunnel, and a forest.

On the other hand, the self-sustaining type measurement tends to be influenced by an accumulation error, a temperature change, and the situation inside and outside of the mobile. For example, a geomagnetism sensor tends to be influenced by an iron bridge. As a result, data detected is not always accurate. Each of these measurements is not necessarily reliable.

Therefore, the GPS measurement and the self-sustaining type measurement are used together now. This is constituted so that it may compensate each defect and it may increase accuracy.

The gyroscope used as means to detect a moving azimuth in the self-sustaining type measurement, outputs data corresponding to the angular speed of a change in azimuth. However, the offset process is needed in the output. Namely, with a gyroscope, even when there is no angular speed, an output is generated. And, value which corresponds to the generated angular speed superimposed on this output value for no angular speed, is outputted when there is angular speed. For this reason, the process of detecting the output when the angular speed is not generated, namely in case there is no change in azimuth, the process of storing it as an output fiducial value (offset value), and the process of subtracting the offset value from gyroscope data outputted from the gyroscope in the detection of the angular speed, are needed to be performed.

In the detection of the offset value in the above-mentioned related art technique, since the angular speed is "0" at the time of a stop, the gyroscope offset value is set up by obtaining stop information from the speed sensor and obtaining the gyroscope output at the time of a stop.

However, in the setup of the above-mentioned gyroscope offset value, it is the value obtained when it is stopped. Here, the actual gyroscope offset value is changed due to changes of temperature or humidity etc. at the time of actual movement, to generate an offset drift. The error of the moving azimuth (gyroscope azimuth) computed from the gyroscope output, increases to degrade the demanded accuracy of the moving azimuth for the navigation system.

SUMMARY OF THE INVENTION

It is therefore an object of the present invention, to provide a navigation apparatus which can offer information of the azimuth of the movable body with high accuracy.

According to the present invention, the above-mentioned object can be achieved by a navigation apparatus for detecting and displaying at least an azimuth of a movable body. The navigation apparatus includes: an angular speed sensor for detecting an angular speed accompanied by the change in the azimuth of the movable body, and outputting angular speed data, which indicates the detected angular speed with respect to an output fiducial value; an azimuth detection device for detecting the azimuth of the movable body, and outputting azimuth data; and an offset correction device for computing a first amount in angle change of the azimuth of the movable body within a predetermined time interval from the angular speed data outputted by the angular speed sensor, computing a second amount in angle change of the azimuth of the movable body within the predetermined time interval from the azimuth data outputted by the azimuth detection device, and correcting the output fiducial value of the angular speed sensor so that the first and second amounts in angle changes become equal to each other.

According to the navigation apparatus of the present invention, in the operation of obtaining the moving azimuth from the output of the angular speed sensor, the offset correction device corrects the output fiducial value i.e. the offset value thereof as follows, by using the amount in angle change of the azimuth computed from the output of the angular speed sensor obtained during the predetermined time interval, and the amount in angle change of the azimuth computed from the output of the azimuth detection device obtained during the same predetermined time interval. When the amount in angle change by the angular speed sensor is less than that by the azimuth detection device, the output fiducial value of the angular speed sensor is corrected so that the computed amount in angle change detected by the angular speed sensor would become greater to make these computed amounts in angle changes detected by the angular speed sensor and the azimuth detection device equal to each other. On the other hand, when the amount in angle change by the angular speed sensor is greater, the output fiducial value is corrected so that the computed amount in angle change detected by the angular speed sensor would become less to make these computed amounts in angle changes detected by the angular speed sensor and the azimuth detection device equal to each other.

Thereby, even when the output fiducial value of the angular speed sensor is changed by environment etc. during the actual movement, by referring to the output of azimuth detection device, the change is detected and the output fiducial value is corrected.

In this manner, according to the present invention, the output fiducial value of the angular speed sensor is properly corrected in correspondence with the offset drift produced to the output of the angular speed sensor, such as a gyroscope. Thus, the accuracy of the azimuth computed from the output of the angular speed sensor is increased, and the moving azimuth with higher accuracy is obtained.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a flow chart of a gyroscope offset correcting process in the embodiment of FIG. 1.

DETAILED DESCRIPTION OF THE PREFERRED EMBODIMENT

Figure 1:
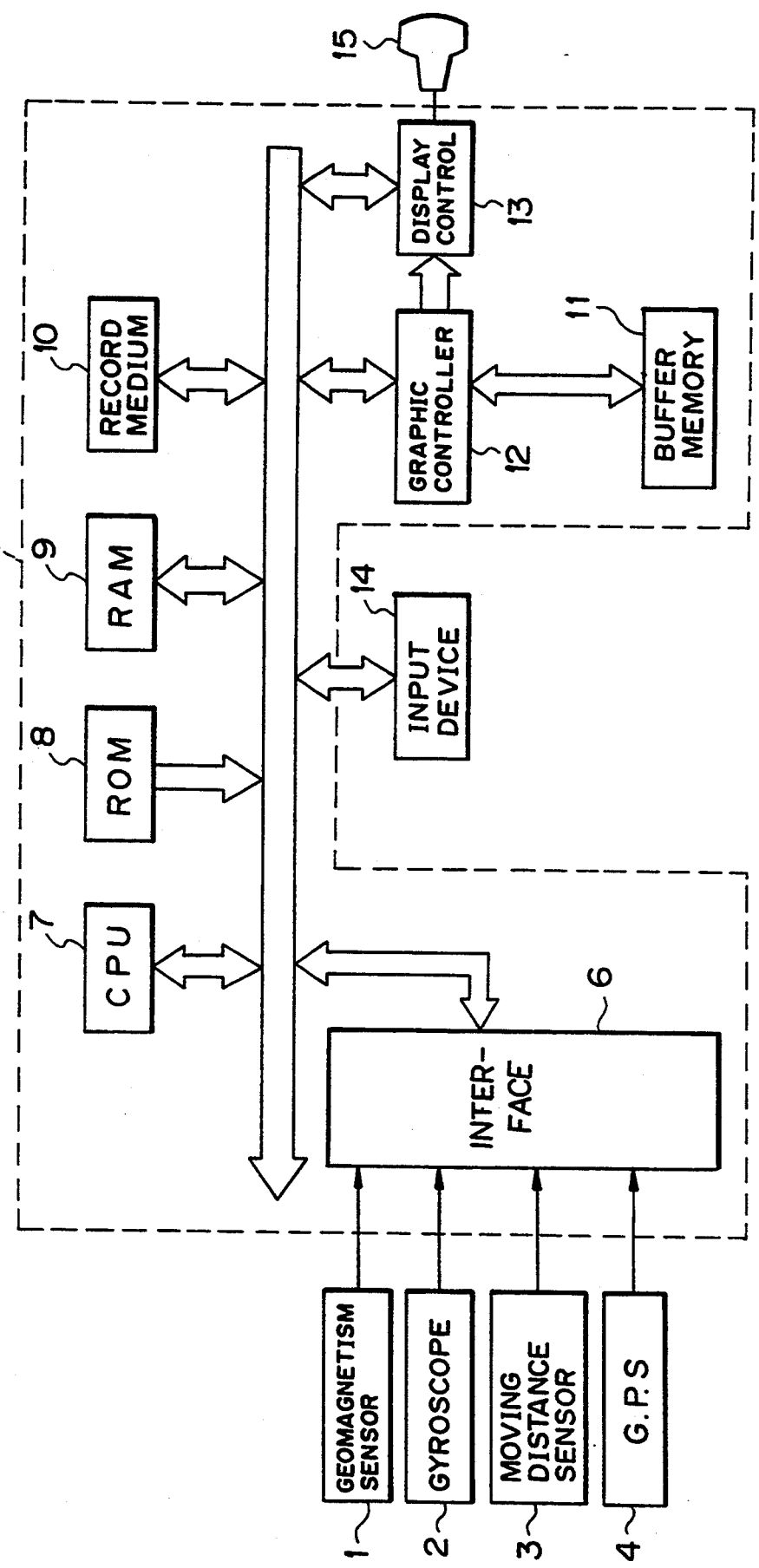
FIG. 1 is a block diagram of an on-vehicle navigation apparatus as one embodiment of the present invention.

Hereinbelow, with reference to the drawings, the embodiment of the present invention will be explained.

FIG. 1 shows the construction of an on-vehicle navigation apparatus as one embodiment of the present invention.

As shown in FIG. 1, the on-vehicle navigation apparatus has a geomagnetism sensor 1, a gyroscope 2, a moving distance sensor 3, a GPS measuring device 4, a system controller 5, an input device 14, and a display device 15.

The geomagnetism sensor 1 outputs absolute azimuth-angle data of the vehicle on the basis of a geomagnetism (earth magnetic field). The gyroscope 2 detects the angular speed accompanied by the direction change of the vehicle, and outputs angular-speed data. The gyroscope 2 is the example of an angular speed sensor.

The moving distance sensor 3 detects whether the vehicle is moving or stopped, and outputs the state. The moving distance sensor 3 outputs the running speed of the vehicle, and data of the moving distance. The GPS measuring device 4 receives the electric wave from two or more GPS satellites, calculates data, such as latitude, longitude, height, and a moving azimuth, and outputs these data. The system controller 5 performs various processes, such as operation and control. The input device 14 is a device for carrying out an indication input to the system controller 5. For example, the display device 15 consists of a LCD (Liquid Crystal Display) apparatus, a CRT (Cathode Ray Tube) display apparatus, an EL (Electroluminescence) display apparatus, etc.

The system controller 5 has an interface 6, a CPU 7 (Central Processing Unit), a ROM 8 (Read Only Memory), a RAM 9 (Random Access Memory), a record medium 10, a buffer memory 11, a graphic controller 12, and a display control circuit 13.

Each output of the geomagnetism sensor 1, the gyroscope 2, the moving distance sensor 3, and the GPS measuring device 4 is inputted into the interface 6. The interface 6 performs an A/D conversion of these input signals etc.

According to a predetermined program, the CPU 7 performs various operation and control. Various kinds of process programs and other required information are written in the ROM 8 beforehand. Write and read-out of information needed in order to perform a program are performed on the RAM 9. The record medium 10 consists of a CD-ROM (Compact Disk-ROM), an IC (Integrated Circuit) card, etc. Digitized map information is recorded in the record medium 10.

The buffer memory 11 consists of a V-RAM (video RAM) etc. The buffer memory 11 is the frame buffer which stores picture information data-expanded temporarily so that the instant display can be performed. The graphic controller 12 draws graphic data sent by instructions of the CPU 7, such as map information, into the buffer memory 11. The graphic controller 12 outputs the drawing data as picture information.

The picture information outputted from the graphic controller 12 is inputted into the display control circuit 13. The display control circuit 13 controls a picture display of display device 12.

The navigation apparatus constituted as mentioned above operates as follows.

Firstly, when the system controller 5 is started, the system controller 5 reads out information to access the map display information, the display information for a self-vehicle position mark, etc. from the record medium 10. The system controller 5 stores thus read data to the RAM 9.

Next, the system controller 5 reads latitude and longitude data which is self-vehicle position information, and moving-azimuth data of the vehicle from the GPS measuring device 4. The system controller 5 reads out the map data corresponding to the self-vehicle position from the record medium 10, and sends this data to the graphic controller 12. The system controller 5 displays the map of the present position on the display device 15. Furthermore, the system controller 5 performs the process of displaying the self-vehicle position mark into the map by use of the self-vehicle position information and the moving azimuth. The system controller 5 reads the self-vehicle position information and the moving-azimuth data from the GPS measuring device 4 periodically.

The system controller 5 performs the process of updating the display position and the direction of the self-vehicle position mark, and the process of updating the map displayed if necessary, by the information. Moreover, the system controller 5 reads the output data of the geomagnetism sensor 1, the gyroscope 2, and the moving distance sensor 3 periodically. By performing a predetermined operation with respect to the output data, the system controller 5 computes the self-vehicle position and the moving azimuth. The system controller 5 compares the computed data and the data from the GPS measuring device 4, and performs a correction process by adjusting the mutual error of these data as explained below in detail.

In calculation of the moving azimuth by the output of the gyroscope 2, the system controller 5 initially sets the output at the time of a stop as the gyroscope offset value. Especially in the present embodiment, during the actual movement, the system controller 5 detects the amount of the drift periodically, and corrects the gyroscope offset value. Namely, the gyroscope offset value is updated so that the relative azimuth (amount in angle change) obtained from the gyroscope 2, and the relative azimuth (amount in angle change) obtained from the geomagnetism sensor 1 would become equal to each other.

Hereinbelow, detailed explanation about this gyroscope offset correcting process will be explained.

Each parameter is defined as follows.

$\Delta\Theta a$: Relative gyroscope azimuth (amount in gyroscope angle change)

$\Delta\Theta m$: Relative geomagnetism azimuth (amount in geomagnetism angle change)

Ji: Gyroscope data (gyroscope output)

Jofs: Gyroscope offset value $\Delta$Jofs: The amount of the gyroscope offset drift G: Gyroscope gain (calculated angle per a unit output)

$\gamma$: Constant (0 to 1)

When there is no offset drift, the relative gyroscope azimuth computed from the output of the gyroscope 2 is computed by the following expression.

$$\Delta\Theta a = (Ji - Jofs) \times G$$

In this case, since there is no offset drift, the relative gyroscope azimuth and the relative geomagnetism azimuth become equal to each other. The relation therebetween is expressed by the following expression (1).

$$\Delta\Theta m = \Delta\Theta a = (Ji - Jofs) \times G \tag{1}$$

On the other hand, the relative gyroscope azimuth, if there exists an offset drift, is expressed by the following expression (2).

$$\Delta\Theta a = \{Ji - (Jofs + \Delta Jofs)\} \times G = (Ji - Jofs - \Delta Jofs) \times G \tag{2}$$

The following expression will be obtained by subtracting the expression (2) from the above-mentioned expression (1).

$$\Delta\Theta m - \Delta\Theta a = \Delta Jofs \times G$$

Transformation of this obtains the following expression (3).

$$\Delta Jofs = (\Delta\Theta m - \Delta\Theta a)/G \tag{3}$$

Amount $\Delta$Jofs of the gyroscope offset drift is computed by the expression (3). This computed $\Delta$Jofs is value about 1 sample term. Since the amount of change in 1 sample term is little, during the state where the vehicle has turned, i.e. while there is the change in azimuth, by the influence of the external disturbance which the geomagnetism sensor 1 receives, the error in $\Delta$Jofs becomes very great.

For this reason as shown in the following expression (4), the present embodiment obtains nth amount $\Delta$Jofsn of the gyroscope offset drift as the amount in angle change of a predetermined term T periodically, not by computing the amount in angle change for just one sample term but by computing the angle sum total of the amount in angle change for the predetermined term T.

$$\Delta Jofsn = \left( \sum_{i=0}^{T} \Delta\Theta mn - i - \sum_{i=0}^{T} \Delta\Theta an - i \right) / (G \times T) \tag{4}$$

Amount $\Delta$Jofsn of the gyroscope offset drift in the past predetermined term is obtained by this expression (4).

Furthermore, by employing a convolutional constant $\gamma$ with respect to the previous gyroscope offset value Jofsn-1, a new gyroscope offset value Jofsn is obtained as follows.

$$Jofsn = (1-\gamma) \times Jofsn\text{-}1 + \gamma \times (Jofsn\text{-}1 + \Delta Jofsn) \tag{5}$$

The gyroscope offset value is updated by the calculation value obtained by this expression (5). The updated value is used in the calculation of the moving azimuth from the gyroscope 2 output.

The flow chart of the gyroscope offset correcting process mentioned above is shown in FIG. 2.

A process step is explained by this flow chart. First, the amount $\Delta\Theta a$ in gyroscope angle change computed from the output of the gyroscope 2 is integrated with the total amount up to the concerned time (step S1), while the amount $\Delta\Theta m$ in geomagnetism angle change from the geomagnetism sensor 1 is integrated with the total amount up to the concerned time (step S2). Next, it is judged whether the predetermined term T has elapsed or not (step S3). When it has not elapsed yet (NO), the process is ended without correction.

When the predetermined term T has elapsed (YES), the amount $\Delta$Jofsn of the gyroscope offset drift is obtained by the above-mentioned expression (4) (step S4). Successively, the gyroscope offset value Jofsn is obtained by the above-mentioned expression (5). This value is updated (step S5). And, for the integration of the next term, each integrated amount in the angle change of the gyroscope 2 and the geomagnetism sensor 1 is cleared respectively (step S6). The time T is reset and the process is ended.

In this manner, the difference between the amount in angle change obtained from the output of the gyroscope 2, and the amount in angle change obtained from the output of the geomagnetism sensor 1, is obtained and compared in the present embodiment. When there is a difference, the amount of the gyroscope offset drift is computed by dividing the difference by the gyroscope gain to correct the gyroscope offset value. In this correction, when the amount in angle change obtained from the output of the gyroscope 2 is less, the gyroscope offset value is corrected so that the amount in angle change may become greater. When the amount in angle change obtained from the output of the gyroscope 2 is greater, the gyroscope offset value is corrected so that the amount in angle change may become less. Thus, the gyroscope offset value is updated so that the amount in angle change obtained from the output of the gyroscope 2, and the amount in angle change obtained from the output of the geomagnetism sensor 1 become equal to each other as a result. Thereby, even when the gyroscope offset value is changed by environmental change etc. at the time of movement, it is corrected by proper value at any time so that it can cancel the influence. The moving azimuth with high accuracy is computed.

In addition, the above-mentioned embodiment is constituted so that the geomagnetism sensor 1 detects the azimuth. However, the present embodiment is not limited to this. For example, the azimuth can be detected by use of the relative GPS azimuth (the amount in the GPS angle change) obtained from the output of the GPS measuring device 4. In this case, the navigation apparatus corrects the gyroscope offset value as follows.

Here, the relative GPS azimuth (the amount in the GPS angle change) is expressed by $\Delta\Theta g$.

The amount $\Delta Jofsn$ of the gyroscope offset drift is obtained from the following expression (6).

$$\Delta Jofsn = \left( \sum_{i=0}^{T} \Delta\Theta gn - i - \sum_{i=0}^{T} \Delta\Theta an - i \right) / (G \times T) \quad (6)$$

Then, the offset value is obtained by the aforementioned expression (5), by use of this amount $\Delta Jofsn$ of the gyroscope offset drift.

Moreover, the azimuth may be detected in the navigation apparatus by the sensor which detects the azimuth by the difference of number of rotations of a wheel based on the output of the moving distance sensor 3. Also in this case, a correcting process can be carried out similarly.

Furthermore, the precise amount $\Delta Jofsn$ of the gyroscope offset drift may be obtained by firstly computing the amount of the gyroscope offset drift respectively from each output of the geomagnetism sensor 1 and the GPS measuring device 4, and then performing the convolution process of these two computed amounts in consideration of their reliabilities.

Namely, as mentioned above, by use of the expression (4), the amount $\Delta Jmofsn$ of the gyroscope offset drift is obtained from each amount in angle change obtained by the gyroscope 2 and the geomagnetism sensor 1. By using the expression (6) similarly at the same time, the amount $\Delta Jgofsn$ of the gyroscope offset drift is obtained from each amount in angle change obtained from the gyroscope 2 and the GPS measuring device 4, in the same term T. And, more precise amount $\Delta Jofsn$ of the gyroscope offset drift is obtained by the following expression by use of a convolutional-constant $\alpha$ (0 to 1).

$$\Delta Jofsn = (1-\alpha) \times \Delta Jmofsn + \alpha \times \Delta Jgofsn$$

Then, the offset value can be obtained by the above-mentioned expression (5) with thus computed amount $\Delta Jofsn$ of the gyroscope offset drift. Thereby, the moving azimuth with higher accuracy can be computed from the output of the gyroscope 2.

As described above, corresponding to the offset drift generated in the output of the angular speed sensor, such as a gyroscope, the offset value is corrected proper according to the present embodiment. For this reason, the azimuth accuracy computed from the output of the angular speed sensor is increased. The moving azimuth with higher accuracy is obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation apparatus for detecting and displaying at least an azimuth of a movable body, comprising:

an angular speed sensor for detecting an angular speed accompanied by the change in the azimuth of the movable body, and outputting angular speed data, which indicates the detected angular speed with respect to an output fiducial value;

an azimuth detection means for detecting the azimuth of the movable body, and outputting azimuth data; and an offset correction means for computing a first amount in angle change of the azimuth of the movable body within a predetermined time interval from the angular speed data outputted by said angular speed sensor, computing a second amount in angle change of the azimuth of the movable body within the predetermined time interval from the azimuth data outputted by said azimuth detection means, and correcting the output fiducial value of said angular speed sensor so that the first and second amounts in angle changes become equal to each other.

2. A navigation apparatus according to claim 1, wherein said angular speed sensor comprises a gyroscope.

3. A navigation apparatus according to claim 1, wherein said azimuth detection means comprises at least one of a geomagnetism sensor, a GPS (Global Positioning System) measuring device, and a moving distance sensor.

4. A navigation apparatus according to claim 1, wherein said offset correction means corrects the output fiducial value by convolutional calculation based on the difference between the first and second amounts in angle changes and a previous output fiducial value.

5. A navigation apparatus according to claim 1, wherein said azimuth detection means comprises a geomagnetism sensor and a GPS measuring device, and said offset correction means computes the second amount in angle change of the azimuth by convolutional calculation based on the outputs of the geomagnetism sensor and the GPS measuring device.

6. A navigation apparatus according to claim 1, wherein said offset correction means comprises a CPU (Central Processing Unit).

7. A navigation apparatus according to claim 1, further comprising a display means, and a display control means for controlling said display means to display map information around a present position of the movable body and a mark indicating the azimuth of the movable body based on the corrected output fiducial value.

8. A navigation apparatus according to claim 7, further comprising a record medium to which map information is stored, and which supplies said display control means with the map information to be displayed.

* * * * *